Oct. 14, 1969     J. M. TATE     3,473,104

INVERTER WITH A SATURABLE INDUCTOR

Filed April 19, 1967     2 Sheets-Sheet 1

3,473,104
Patented Oct. 14, 1969

3,473,104
INVERTER WITH A SATURABLE INDUCTOR
John M. Tate, Levittown, Pa., assignor to ESB Incorporated, Philadelphia, Pa., a corporation of Delaware
Filed Apr. 19, 1967, Ser. No. 632,068
Int. Cl. H02m 7/44, 7/68
U.S. Cl. 321—45                    8 Claims

ABSTRACT OF THE DISCLOSURE

A transistor circuit utilizing a multicore transformer having at least one core to supply drive current proportional to load current for the transistor switching elements and an output core to supply the required step-up and step-down voltage transformation. A saturable inductor is employed to obtain proportionality between the applied voltage and the frequency of oscillation. Regulation can be provided by adjusting the voltage on the saturable inductor in accordance with a control voltage.

BACKGROUND OF INVENTION

Fuel cells, thermoelectric generators and solar cells are presently being used as power sources in a variety of electrical systems. While these devices differ in many respects, they all provide a direct current output at a low voltage level. If the output of these sources is to be converted to a high voltage alternating current, a high efficiency low voltage inversion device is required. Generally prior art inverter circuits employ voltage feedback to drive the transistor switching elements. This type of inverter circuit is characterized by an efficiency which varies in accordance with the load on the inverter. In addition, circuit power losses are not reduced in proportion to operating voltage making them extremely inefficient for low voltage operation. Prior art in inverter circuits employing current feed back for transistor switching have heretofore employed separate current and voltage transformers. Since each of these transformers has inherent primary winding losses, the overall efficiency of this type of circuit is reduced. Still further in two transformer circuits of this type the flow of transistor turn-off current generally causes an increase in the transistor driving current producing high power dissipation during the switching interval.

It is an object of the present invention to provide an inverter particularly adapted to operate from a low voltage source which is characterized by a high efficiency and reliability.

Another object of the present invention is to provide an inverter in which the transistors are driven proportionally to the load current thereby providing a high efficiency substantially independent of the load.

Still another object of the present invention is to provide an inverter in which the power required to turn-off the switching transistors is reduced to a minimum.

A further object of the present invention is to provide an inverter utilizing a multicore transformer having a single primary winding thereby reducing transformer power losses.

A still further object of the present invention is to provide an inverter the output of which can be regulated by means of relatively noncomplex circuitry.

SUMMARY OF INVENTION

The foregoing objects of the present invention are achieved by a transistor inverter circuit utilizing a transformer having at least one core to supply drive current for the transistor switching elements and an output core to supply the required voltage transformation. A pair of transistors operated as synchronous switches cause a DC current from the source to be inverted to flow alternately in opposite directions through a center-tap primary winding which encompasses all transformer cores. The output winding of the transformer which supplies step-up or step-down voltage transformation encompasses only the output core of the transformer. The driving current for the transistors is obtained from a current feedback winding which encompasses the transformer current core. The voltage feedback means including a saturable inductor and a voltage feedback winding encompassing at least the output core provides the transistor turn-off drive and the proportionality of output voltage and frequency. Regulation can be provided by varying the voltage impressed upon the saturable reactor in accordance with a control voltage.

BRIEF DESCRIPTION OF THE DRAWINGS

A better understanding of the present invention may be had from the following description when read with reference to the accompanying drawings in which.

DESCRIPTION OF PREFERRED EMBODIMENT

Figure 1:
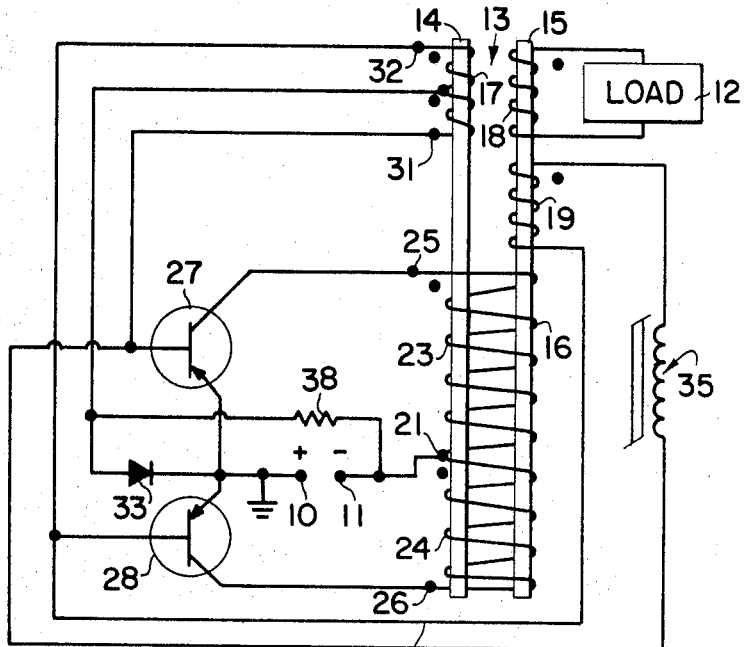
FIG. 1 is a circuit diagram of the basic inverter circuit of the present invention.

Referring now to the drawings, FIG. 1 is a circuit diagram of the basic inverter circuit of the present invention. This circuit is adapted to invert a DC voltage applied across the terminals 10 and 11 to supply an alternating current to a load 12. The inverter utilizes a transformer generally designated as 13 having at least a pair of cores 14 and 15, a primary winding 16, a current feedback winding 17, an output winding 18 and a voltage feedback winding 19. The windings 16, 17, 18 and 19 have the polarities indicated by the polarity marks.

The primary winding 16 of the transformer 13 which encompasses both of the cores 14 and 15 has a center-tap 21 and two equal sections 23 and 24 with end terminals 25 and 26, respectively. A DC voltage applied across the terminals 10 and 11 causes a current to flow alternately in opposite directions through the primary winding sections 23 and 24 in accordance with the operation of a pair of transistor switching elements 27 and 28. The transistors 27 and 28 have the usual emitter, collector and base electrodes. The collector of the transistor 27 is connected to the end terminal 25 of the primary winding section 23 and the emitter of the transistor 27 is connected to the center-tap 21 through the terminals 10 and 11. Similarly, the collector of the transistor 28 is connected to the end terminal 26 of the primary winding section 24 and the emitter of the transistor 28 is connected to the center-tap 21 through the terminals 10 and 11.

The core 14 of the transformer 13 is utilized to supply driving current for the transistors 27 and 28. This drive current is provided by the center-tapped current feedback winding 17 which encompasses only the core 14. The current feedback 17 has a center-tap 30 and end terminals 31 and 32 which are connected to the respective base electrodes of the transistors 27 and 28. The center-tap of the current feedback winding 17 is connected to the emitters of the transistors 27 and 28 through a diode 33.

The core 15 of the transformer 13 is the output core and is adapted to supply the required step-up or step-down voltage transformation for the inverter output. The output from the inverter is supplied to the load 12 from the output winding 18 which encompasses the core 15.

The turn-off pulse for the transistors 27 and 28 is derived from the voltage feedback winding 19 which encompasses the output core 15 of the transformer 13. The voltage feedback winding 19 is connected to the respective base electrodes of the transistors 27 and 28 through a saturable inductor 35 by means of the conductors 36 and 37. The saturable inductor 35 provides proportionality between the voltage applied across the terminals 10 and 11 and the operating frequency of the inverter. Forward bias for the transistors 27 and 28 is supplied by a resistor 38 connected between the terminal 12 and the anode of the diode 33.

In operation, when the transistor 28 is made conductive by a negative pulse on its base, current will flow from a source connected between the terminals 10 and 11 through the primary winding section 24. The polarity of the current feedback winding 17 is such that this current flow in the primary winding section 24 biases the transistor 28 such that it is driven further into saturation and driving bias in proportion to the primary winding current. Simultaneously, the transistor 27 is reversed biased.

Current flow in the voltage feedback winding 19 is restricted until the inductor 35 saturates. When the inductor 35 saturates, current will flow through the winding 19 and apply a reverse bias to the transistor 28 turning it off and a forward bias to the transistor 27 turning it on. The transistor 27 then becomes conductive until turned off by the saturation of the inductor 35 and the process is repeated producing an alternating current in the output winding 18 and the load 12.

The efficiency of the circuit is high for several reasons. The utilization of the multicore transformer 13 with the single center-tapped primary winding 16 eliminates the losses associated with the two primary winding circuits of prior art current feedback inverters. In addition, the transistors are driven into conduction with a current proportional to the load current and as a result the efficiency is relatively independent of the load. As will be noted by those skilled in the art, the circuit of the present invention does not require the base current limiting resistors usually found in voltage feedback type inverter circuits.

The circuit of FIG. 1 is relatively frequency stable when operating under normal load. When operating under a light load or no load, however, the output frequency will rise due to insufficient base drive from the current feedback winding 17. This condition can be corrected, however, if the core 15 is fabricated of substantially square hysteresis loop material having a higher magnetization current than core 14.

Figure 2:
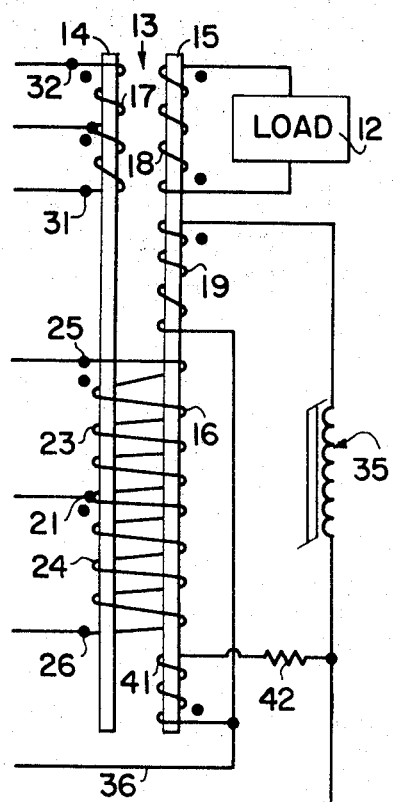
FIG. 2 is a circuit diagram showing a modification of the multicore transformer of the inverter circuit of FIG. 1 which provides stable no load operation.

Referring now to FIG. 2 there is shown a modification of the circuit of FIG. 1 which will provide stable no load operation without the utilization of a square hysteresis loop material for the core 15. Similar reference characters have been employed to designate components similar to those of FIG. 1. In this modification no load voltage feedback drive to maintain the transistors in saturation is applied by an additional feedback winding 41 encompassing the output core 15. The voltage feedback winding 41 is of opposite polarity to the voltage feedback winding 19 and supplies a positive feedback as opposed to the negative feedback of the winding 19. The winding 41 is connected to the respective base electrodes of the transistors 27 and 28 through a current limiting resistor 42 and the conductors 36 and 37. From the efficiency standpoint the modification of FIG. 2 is preferable to having the core 15 made of a square hysteresis loop material since such material is of inherently high loss as compared to other types of core material.

Figure 3:
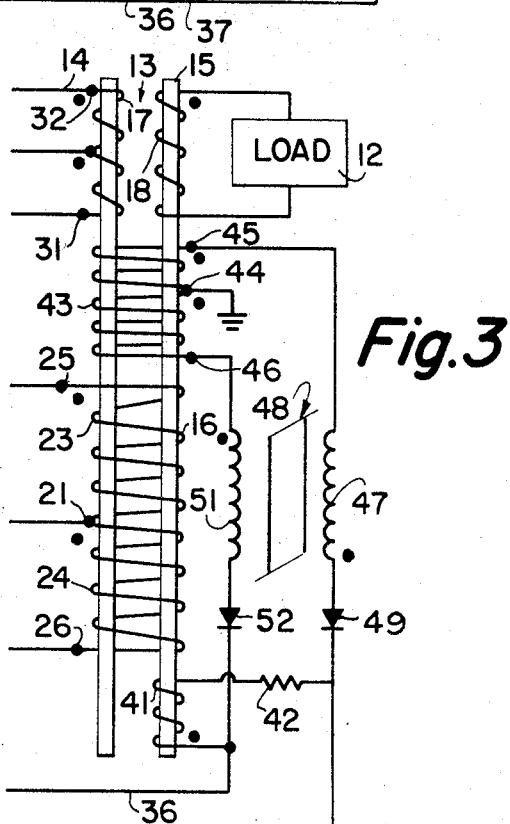
FIG. 3 is a circuit diagram showing another modification of the multicore transformer of FIG. 1 which provides improved transistor switching.

Referring now to FIG. 3, there is shown a modification of the circuit of FIG. 1 which is designed to provide improved transistor switching. In this circuit the negative voltage feedback is supplied from a center-tap voltage feedback winding 43 encompassing both of the transformer cores 14 and 15. The winding 43 has a center-tap 44 connected to ground and end terminals 45 and 46. The end terminal 45 is connected to the base of the transistor 27 through a winding 47 on a saturable inductor 48, a diode 49 and the conductor 37. The end terminal 46 of the winding 43 is connected to the base of the transistor 28 through a winding 51 on the saturable inductor 48, a diode 52 and the conductor 36. The windings 47 and 51 on the saturable inductor 48 are separate windings. The diode 49 and 52 prevent the driving current from flowing to the off transistor.

The use of a center-tapped negative voltage feedback winding 43 allows the transistor turn-off drive to be applied only to the conducting transistor. This prevents the drive from going through the emitter-base junction of the non-conducting transistor the effect of which is to cause turn-on before the other transistor is turned off. This helps to reduce the effects of the transistor delay time. Then the negative voltage feedback winding engages only the output core of the transformer 13, the turn-off pulse formed when the reactor in the negative feedback loop saturates is sensed by the core 14 and the winding 17, hence, the drive current can continue to increase negating the effect of the turn-off pulse. When the negative voltage feedback winding is wound on both cores of the transformer, this condition does not occur and improved switching is obtained.

Figure 4:
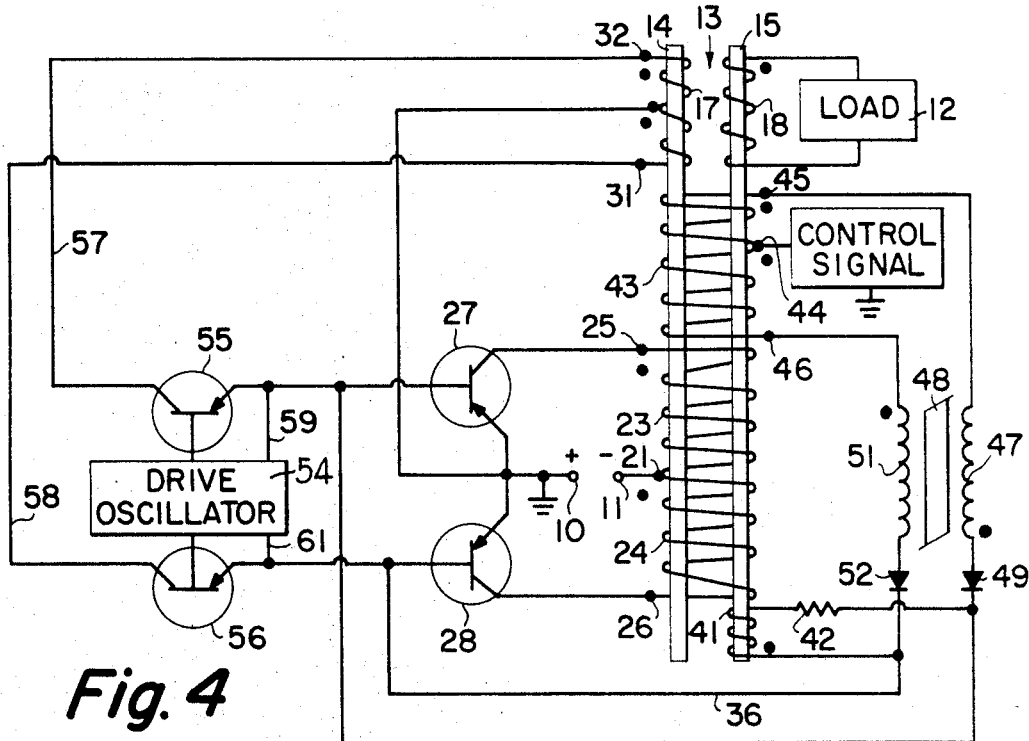
FIG. 4 is a circuit diagram of a regulated inverter in accordance with the present invention.

Referring now to FIG. 4, there is shown a circuit diagram of the inverter of the present invention having regulation via time ratio control. Once again similar reference characters have been employed to designate components similar to those in FIGS. 1–3. In this circuit a drive oscillator 54 is used to initiate the beginning of each half cycle and to gate the power switching transistors 27 and 28 via a pair of blocking transistors 55 and 56. As will be understood by those skilled in the art, the drive oscillator 54 can be an inverter of the type shown in FIG. 1. The transistors 55 and 56 have the usual emitter, collector and base electrodes. As shown the collector of the transistor 55 is connected to the end terminal 32 of the current feedback winding 17 by means of a conductor 57. Similarly, the collector of the transistor 56 is connected to the end terminal 31 of the current feedback winding 17 by means of the conductor 58. The emitters of the transistors 55 and 56 are connected respectively to the bases of the transistors 27 and 28. The base electrodes of the transistors 55 and 56 are connected to the drive oscillator 54. The drive oscillator 54 is also connected to the bases of the transistors 27 and 28 by means of the conductors 59 and 61 to apply a starting pulse to these transistors. Regulation is accomplished by means of a control signal source 45 connected between the center-tap 44 and the voltage feedback winding 43 and ground. The control signal for regulation can be provided with appropriate circuitry from the inverter output.

In operation, the drive oscillator 54 causes the transistors 27 and 28 to be alternately switched on by turning on the transistors 55 and 56 and by applying a starting pulse to the transistor to be turned on through the conductors 59 and 61. When turned on the current feedback signal from the current feedback winding 17 provides the turn-on drive for the transistors 27 and 28 proportional to the load current. The on-time of each alternate half cycle is dictated by the volt-second capability of the saturable reactor 48 and the voltage impressed upon it by the control signal source 45. To facilitate rapid transistor turn-off the signal 45 should be a low transient impedance source.

Figure 5:
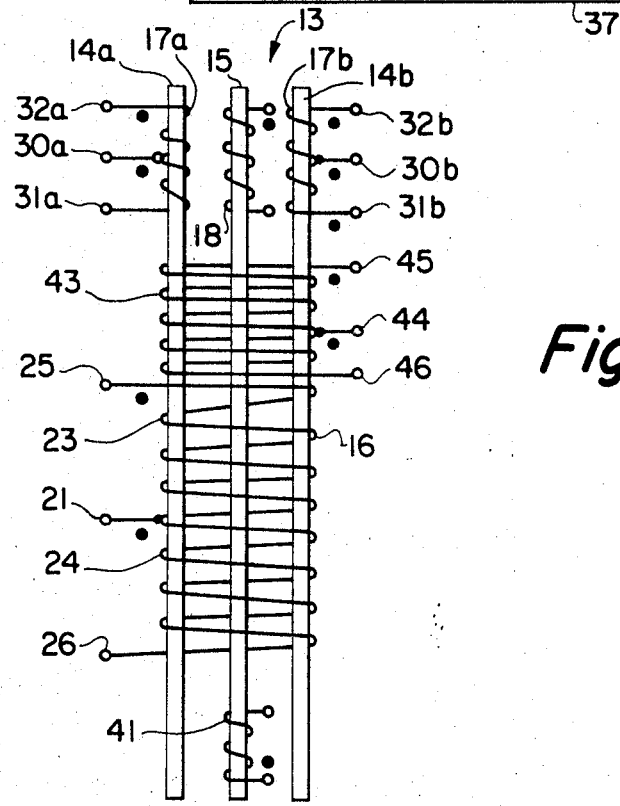
FIG. 5 is a schematic representation of a transformer for an inverter of the present invention having a symmetrical core arrangement.

For simplicity, the transformer 13 is shown as having two cores. It should be understood, however, that in order to achieve flux path symmetry and low leakage reactance it is generally desirable to have a symmetrical core arrangement. This can be achieved by utilizing two drive current cores symmetrically spaced with respect to the output core. Such an arrangement permits uniform magnetic coupling of all of the windings. Referring now to FIG. 5, there is shown a schematic representation of the output transformer 13 of FIGS. 1–4 designed to provide this symmetry. The transformer 13 has the output core 15 and a pair of drive current cores 14a and 14b symmetrically spaced with respect to each other. In actual construction these could be a stack of three toroidal cores. As shown the current feedback winding 17 is split into two sections 17a and 17b encompassing the current drive cores 14a and 14b, respectively. The winding 17a has a center-tap 30a and end terminals 31a and 32a and similarly, the current feedback winding 17b has a center-tap winding 30b and end terminals 31b and 32b. In operation, the two windings are connected in parallel with the end terminal 31a connected to the end terminal 31b, the end terminal 32a connected to 32b and the center-taps 30a and 30b connected together. The other windings of the transformer are as previously shown FIG. 3.

The inverter circuit of the present invention are specifically designed to achieve high efficiency with a minimum of circuitry. The utilization of a multifunction transformer, that is one providing both current feedback and output voltage transformation, greatly simplify the circuitry required for effective and reliable inverter operation. In addition, this permits the removal of energy from the circuit without reflection of this current change into the transistor base drive circuit keeping efficiency high. These features make the inverter of the present invention particularly adapted for low voltage high circuit application.

I claim:

Having described the invention that which is claimed as new is:

1. A static inverter comprising, in combination;
a transformer having at least two cores;
an output winding encompassing one of said cores;
a center-tapped primary winding encompassing all of said cores;
a pair of terminals adapted to be connected to a source of direct current;
a pair of transistor switching elements each having emitter, collector and base electrodes, the emitter-collector electrodes of one of said transistors connecting said terminals between the center-tap and one end terminal of said primary winding and the emitter-collector electrodes of the other of said transistors connecting said terminals between the center-tap and the other end terminal of said primary winding whereby alternate switching of said transistors causes current applied between said terminals to flow alternately in opposite directions through said center-tapped primary winding;
a center-tapped current feedback winding encompassing a core not encompassed by said output winding and connected to the base electrodes of said transistors to drive them proportionally to their respective collector currents;
a negative voltage feedback winding encompassing at least the core encompassed by said output winding; and
circuit means including a saturable core means connecting said voltage feedback winding to the base electrodes of said transistors to regulate the frequency of transistor switching.

2. Inverter as specified in claim 1 wherein said negative voltage feedback winding encompasses all cores of said transformer.

3. Inverter as specified in claim 1 wherein said negative voltage feedback winding is a center-tapped winding.

4. Inverter as specified in claim 1 wherein the core encompassed by said output winding has a substantially square hysteresis loop.

5. A static inverter comprising, in combination;
a pair of transistor switching elements each having emitter, collector and base electrodes;
a transformer having at least one core to supply drive current to said transistors and an output core to supply voltage transformation;
an output winding encompassing said output core;
a pair of terminals adapted to be connected to a source of direct current;
a center-tap primary winding encompassing all of said cores, one end terminal of said primary winding being connected through the emitter and collector electrodes of one of said transistors and said terminals to said center-tap and the other end terminal of said primary winding being connected through the emitter and collector electrodes of the other of said transistors and said terminals to said center-tap;
a center-tapped current feedback winding encompassing said drive current core and having its end terminals connected to the respective base electrodes of said transistors and its center-tap to the emitters of said transistors to supply drive current to said transistor,
a negative voltage feedback winding encompassing at least said output core; and
circuit means including saturable core means connecting said voltage feedback winding to the base electrodes of said transistors to supply turn-off drive to render said transistors nonconductive upon saturation of said saturable core means.

6. Inverter as specified in claim 5 wherein said negative voltage feedback winding encompasses all cores of said transformer.

7. Inverter as specified in claim 5 wherein said negative voltage feedback winding is a center-tapped winding.

8. Inverter as specified in claim 5 wherein the core encompassed by said output winding has a substantially square hysteresis loop.

References Cited
UNITED STATES PATENTS

| | | | |
|---|---|---|---|
| 3,268,833 | 8/1966 | Miller et al. | 321—44 |
| 3,324,411 | 6/1967 | Mehwald | 321—45 |
| 3,339,080 | 8/1967 | Howald | 321—45 |
| 3,417,313 | 12/1968 | Palmer | 321—45 |

BERNARD KONICK, Primary Examiner

BARRY L. HALEY, Assistant Examiner

U.S. Cl. X.R.

307—88